United States Patent
Laksono et al.

(10) Patent No.: US 9,530,450 B2
(45) Date of Patent: Dec. 27, 2016

(54) VIDEO SYSTEM WITH FOVEA TRACKING AND METHODS FOR USE THEREWITH

(71) Applicant: ViXS Systems, Inc., Toronto (CA)

(72) Inventors: Indra Laksono, Richmond Hill (CA); John Pomeroy, Markham (CA); Sally Jean Daub, Toronto (CA); Xu Gang Zhao, Maple (CA)

(73) Assignee: VIXS SYSTEMS, INC., Toronto (CA)

( * ) Notice: Subject to any disclaimer, the term of this patent is extended or adjusted under 35 U.S.C. 154(b) by 0 days.

(21) Appl. No.: 14/695,567

(22) Filed: Apr. 24, 2015

(65) Prior Publication Data

US 2015/0279418 A1    Oct. 1, 2015

Related U.S. Application Data (63) Continuation-in-part of application No. 14/590,303, filed on Jan. 6, 2015, which is a continuation-in-part of application No. 14/217,867, filed on Mar. 18, 2014, and a continuation-in-part of application No. 14/477,064, filed on Sep. 4, 2014.

(51) Int. Cl.

| | |
|---|---|
| *H04N 7/16* | (2011.01) |
| *G11B 20/10* | (2006.01) |
| *G11B 27/30* | (2006.01) |
| *H04N 21/4415* | (2011.01) |
| *H04N 21/442* | (2011.01) |
| *H04N 21/6587* | (2011.01) |

(52) U.S. Cl.
CPC ......... *G11B 20/10527* (2013.01); *G11B 27/30* (2013.01); *H04N 21/4415* (2013.01); *H04N 21/44204* (2013.01); *H04N 21/44218* (2013.01); *H04N 21/6587* (2013.01); *G11B 2020/10592* (2013.01)

(58) Field of Classification Search
None
See application file for complete search history.

(56) References Cited

U.S. PATENT DOCUMENTS

| | | | | |
|---|---|---|---|---|
| 5,270,748 A | * | 12/1993 | Katz ................ | G02B 27/0093 351/209 |
| 5,481,622 A | * | 1/1996 | Gerhardt ............. | A61B 3/113 345/158 |
| 6,181,371 B1 | * | 1/2001 | Maguire, Jr. .......... | G06F 3/011 345/8 |
| 6,959,450 B1 | * | 10/2005 | Ritter ................ | H04N 7/17318 348/103 |
| 7,027,655 B2 | * | 4/2006 | Keeney .............. | H04N 19/115 375/E7.182 |
| 2002/0057279 A1 | * | 5/2002 | Jouppi ................ | G06T 3/4038 345/619 |

(Continued)

*Primary Examiner* — Pankaj Kumar
*Assistant Examiner* — Timothy Newlin
(74) *Attorney, Agent, or Firm* — Garlick & Markison; Bruce E. Stuckman (57) ABSTRACT

A viewer fovea tracking generator is configured to analyze image data corresponding to a viewing of the video program via an A/V player by at least one viewer, and to generate fovea tracking data corresponding to the at least one viewer. A network interface configured to transmit the fovea tracking data to the video source via a network. The video program is fovea encoded by the video source in accordance with the fovea tracking data.

16 Claims, 5 Drawing Sheets

(56) References Cited

U.S. PATENT DOCUMENTS

| | | | | |
|---|---|---|---|---|
| 2002/0064314 | A1* | 5/2002 | Comaniciu | G06T 9/001 |
| | | | | 382/239 |
| 2002/0113782 | A1* | 8/2002 | Verberne | G06F 1/1616 |
| | | | | 345/204 |
| 2002/0144276 | A1* | 10/2002 | Radford | H04N 7/17318 |
| | | | | 725/87 |
| 2010/0309391 | A1* | 12/2010 | Plut | H04N 9/3147 |
| | | | | 348/756 |
| 2012/0105310 | A1* | 5/2012 | Sverdrup | G02B 27/017 |
| | | | | 345/8 |
| 2013/0126703 | A1* | 5/2013 | Caulfield | H04N 5/30 |
| | | | | 250/206 |
| 2013/0195204 | A1* | 8/2013 | Reznik | H04N 19/85 |
| | | | | 375/240.26 |
| 2014/0362346 | A1* | 12/2014 | Leinonen | A61B 5/16 |
| | | | | 351/224 |

* cited by examiner

VIDEO SYSTEM WITH FOVEA TRACKING AND METHODS FOR USE THEREWITH

CROSS REFERENCE TO RELATED PATENTS

The present U.S. Utility Patent Application claims priority pursuant to 35 U.S.C. §120 as a continuation-in-part of U.S. Utility application Ser. No. 14/590,303, entitled "AUDIO/VIDEO SYSTEM WITH INTEREST-BASED AD SELECTION AND METHODS FOR USE THEREWITH", filed Jan. 6, 2015, which is a continuation-in-part of U.S. Utility application Ser. No. 14/217,867, entitled "AUDIO/VIDEO SYSTEM WITH USER ANALYSIS AND METHODS FOR USE THEREWITH", filed Mar. 18, 2014, and claims priority pursuant to 35 U.S.C. §120 as a continuation-in-part of U.S. Utility application Ser. No. 14/477,064, entitled "VIDEO SYSTEM FOR EMBEDDING EXCITEMENT DATA AND METHODS FOR USE THEREWITH", filed Sep. 4, 2014, all of which are hereby incorporated herein by reference in their entirety and made part of the present U.S. Utility Patent Application for all purposes.

TECHNICAL FIELD

The present disclosure relates to audio/video systems that process and present audio and/or display video signals.

DESCRIPTION OF RELATED ART

Modern users have many options to view audio/video programming. Home media systems can include a television, a home theater audio system, a set top box and digital audio and/or A/V player. The user typically is provided one or more remote control devices that respond to direct user interactions such as buttons, keys or a touch screen to control the functions and features of the device. Audio/video content is also available via a personal computer, smartphone or other device. Such devices are typically controlled via a buttons, keys, a mouse or other pointing device or a touch screen.

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. Further, encoding algorithms have been developed primarily to address particular issues associated with broadcast video and video program distribution.

DETAILED DESCRIPTION

FIGS. 1-4 present pictorial diagram representations of various video devices in accordance with embodiments of the present disclosure. In particular, device 10 represents a set top box with or without built-in digital video recorder functionality or a stand-alone digital video player such as an internet video player, Blu-ray player, digital video disc (DVD) player or other video player. Device 20 represents an Internet tablet. Device 30 represents a laptop, netbook or other portable computer. Device 40 represents a video display device such as a television or monitor. Device 50 represents a smartphone, phablet or other mobile communication device.

The devices 10, 20, 30, 40 and 50 each represent examples of electronic devices that incorporate one or more elements of a system 125 that includes features or functions of the present disclosure. While these particular devices are illustrated, system 125 includes any device or combination of devices that is capable of performing one or more of the functions and features described in conjunction with FIGS. 5-12 and the appended claims.

Figure 1:
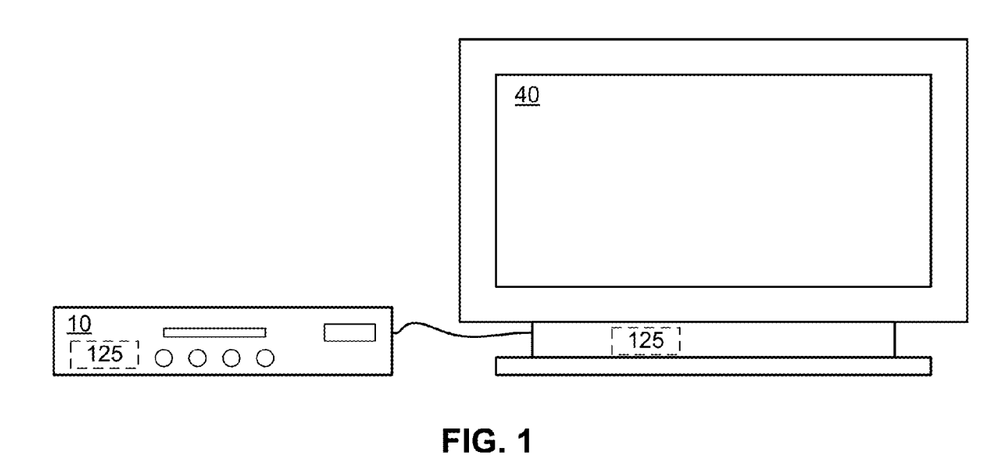
FIGS. 1-4 present pictorial diagram representations of various video devices in accordance with embodiments of the present disclosure.
Figure 2:
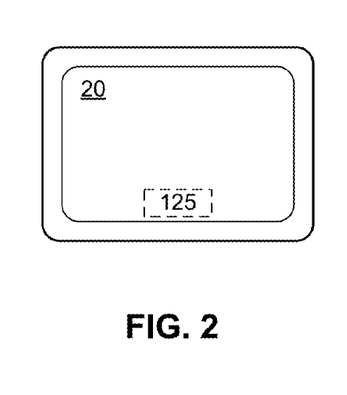
Figure 3:
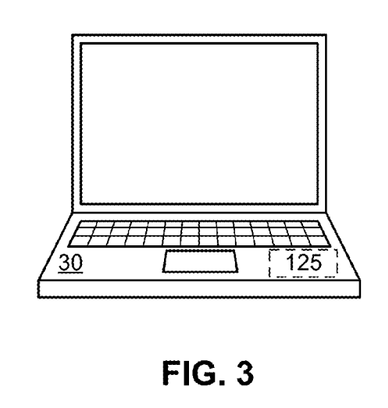
Figure 4:
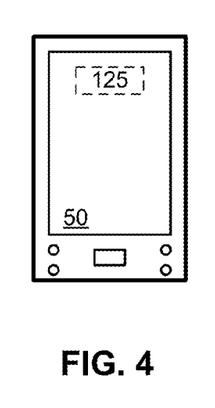
Figure 5:
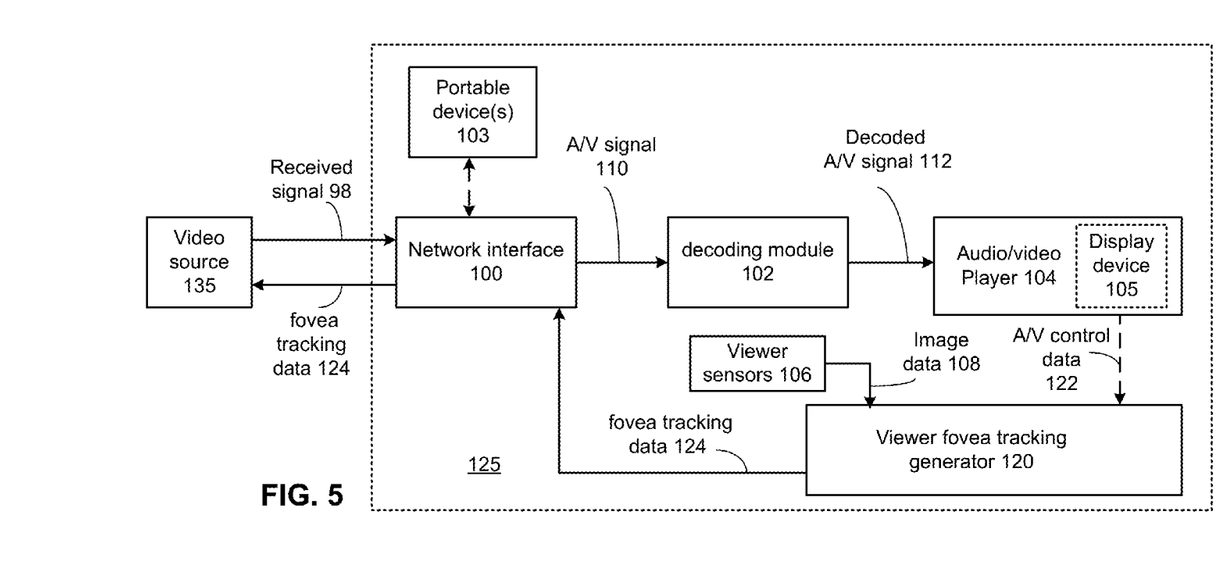
FIG. 5 presents a block diagram representation of a system in accordance with an embodiment of the present disclosure.

FIG. 5 presents a block diagram representation of a system in accordance with an embodiment of the present disclosure. In an embodiment, system 125 includes a network interface 100, such as a television receiver, cable television receiver, satellite broadcast receiver, broadband modem, a Multimedia over Coax Alliance (MoCA) interface, Ethernet interface, local area network transceiver, Bluetooth, 3G or 4G transceiver and/or other information receiver or transceiver or network interface that is capable of receiving a received signal 98 and extracting one or more audio/video signals 110. In addition to receiving received signal 98, the network interface 100 can provide an Internet connection, local area network connection or other wired or wireless connection to a video source 135 and optionally one or more portable devices 103 such as tablets, smart phones, lap top computers or other portable devices. While shown as a single device, network interface 100 can be implemented by two or more separate devices, for example, to receive the received signal 98 via one network and to communicate with portable devices 103 and video source 135 via one or more other networks.

The received signal 98 is received from a video source 135 such as a streaming video server, a video on demand server, or other video source. The received signal 98 can be a compressed video signal, such as a unicast video signal, streaming video signal or other video signal that has been transmitted over a wireless medium, either directly or through one or more satellites or other relay stations or through a cable network, optical network or other transmission network, without or without an accompanying audio signal. In addition, received signal 98 can be generated from a stored video file, played back from a recording medium such as a magnetic tape, magnetic disk or optical disk, and can include a streaming video signal or other unicast signal that is transmitted over a public or private network such as a local area network, wide area network, metropolitan area network or the Internet.

Received signal 98 can include a compressed digital video signal complying with a digital video codec standard such as H.264, MPEG-4 Part 10 Advanced Video Coding (AVC), VC-1, H.265, or another digital format such as a Motion Picture Experts Group (MPEG) format (such as MPEG1, MPEG2 or MPEG4), QuickTime format, Real Media format, Windows Media Video (WMV) or Audio Video Interleave (AVI), etc. When the received signal 98 includes a compressed digital video signal, a decoding module 102 or other video codec decompresses the audio/video signal 110 to produce a decoded audio/video signal 112 suitable for display by a video display device of audio/video player 104 that creates an optical image stream either directly or indirectly, such as by projection.

When the received signal 98 includes a compressed digital audio signal, the decoding module 102 can decompress the audio/video signal 110 and otherwise process the audio/video signal 110 to produce a decoded audio signal suitable for presentation by an audio player included in audio/video player 104. The decoded audio/video signal 112 can include a high definition media interface (HDMI) signal, digital video interface (DVI) signal, a composite video signal, a component video signal, an S-video signal, and/or one or more analog or digital audio signals.

When A/V signal 110 is received and the decoded video signal 112 is produced in a digital video format, the digital video signal may be optionally scrambled or encrypted, may include corresponding audio and may be formatted for transport via one or more container formats. Examples of such container formats are encrypted Internet Protocol (IP) packets such as used in IP TV, Digital Transmission Content Protection (DTCP), etc. In this case the payload of IP packets contain several transport stream (TS) packets and the entire payload of the IP packet is encrypted. Other examples of container formats include encrypted TS streams used in Satellite/Cable Broadcast, etc. In these cases, the payload of TS packets contain packetized elementary stream (PES) packets. Further, digital video discs (DVDs) and Blu-Ray Discs (BDs) utilize PES streams where the payload of each PES packet is encrypted. When the received signal 98 is scrambled or encrypted, the decoding module 102 further operates to descramble and/or decrypt the received signal 98 to produce the decoded audio/video signal 112.

The viewer fovea tracking generator 120 is configured to analyze image data 108 generated by one or more viewer sensors 106 corresponding to a viewing of the video program via the A/V player by at least one viewer. For example, a viewer sensor 106 generates image data 108 in a presentation area of the A/V player 104. The viewer sensor 106 can include a digital camera such as a still or video camera that is either a stand-alone device, or is incorporated in any one of the devices 10, 20, 30 or 40 or other device that generates the image data 108. In addition or in the alternative, the viewer sensor 106 can include an infrared sensor, thermal imager, background temperature sensor or other thermal imaging sensor, an ultrasonic imaging sensor or other sonar-based sensor, and/or other sensors for generating image data 108 that can be used by the viewer fovea tracking generator 120 for determining the presence of viewers, for optionally identifying particular viewers, and/or for determining the portions of the display screen that the one or more viewers are currently watching. In addition or in the alternative, image data can be generated by cameras associated with one or more portable devices 103 associated with the viewer(s).

Consider an example where a family is watching TV. One or more video cameras are stand-alone devices or are built into the TV, a set top, Blu-Ray player, or portable devices 103 associated with the viewers. The camera or cameras capture video of the presentation environment and viewers. The viewer fovea tracking generator 120 processes the video and detects if there are viewers present, how many viewers are present, the identities of each of the viewers and further to determine the focus of interest by each of the viewers to generate fovea tracking data 124 corresponding to the viewer(s).

In an embodiment, the viewer fovea tracking generator 120 tracks that viewers' eyes and/or head to determine the region of the screen that is being watched by the viewer—an area of viewer focus of the viewer of viewers. As used herein, the area of viewer focus is a prediction of estimation of the region of the display screen corresponding to the viewer's visual fovea—i.e. the portion of the display that is subject to viewer's central vision as opposed to the viewer's peripheral vision. The fovea tracking data 124 is generated to indicate the region of viewer focus in the video program corresponding to the viewer(s). The network interface 100 configured to transmit the fovea tracking data 124 to the video source 135 via a network. The video program is fovea encoded at the video source 135 in accordance with the fovea tracking data 124 for transmission as received signal 98. In particular, the video program can be fovea encoded in accordance with the fovea tracking data 124 to greater accuracy within the region of viewer focus compared with an encoding accuracy outside the region of viewer focus. In this fashion, the received signal 98 includes a video stream that is encoded to provide maximum resolution, color depth and encoding accuracy for the region or regions of viewer focus of any and all of the viewers. As the viewers' change what they are looking at on the screen, the region or regions of accurate encoding can move around.

The operation of system 125 can be further described in conjunction with the following examples that include several optional functions and features. A viewers' eyes and/or head movements can be tracked and used to determine if there is a stable fovea on the screen based on the analysis of eye or head movements over time. If it is determined that the viewer or viewers' central vision is consistently or predominately focused on a particular region of display device 105, then fovea tracking data 124 can be generated to indicate this stable region and indicating that a fovea encoding mode can be enabled.

In a further example, a user of the A/V player 104 can interact with the a user interface of the A/V player 104 to enter this fovea encoding mode in order to save on network charges, to reduce the cost of a streaming or video on demand selection and/or to increase the quality of experience of the video by enhancing the resolution of one or more regions of interest in the video program while adapting to available transmission bandwidth. The user can opt into this mode via interaction with the user interface associated with A/V player 104 and generation of A/V control data 122 that indicates this fovea tracking/encoding mode of operation.

The decoding module 102, A/V player 104 and the viewer fovea tracking generator 120 can each be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. These memories may each be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when decoding module 102, A/V player 104 and the viewer fovea tracking generator 120 implement one or more of their functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

While system 125 is shown as an integrated system, it should be noted that the system 125 can be implemented as a single device or as a plurality of individual components that communicate with one another wirelessly and/or via one or more wired connections. As described in conjunction with FIGS. 2-4, system 125 can be implemented entirely via a mobile communication device such as a laptop, tablet or smartphone with a back facing camera. Downstream bandwidth can be saved by using full resolution on only on part of the screen. In this fashion a user on the go can enjoy a video program on a smaller screen that a traditional television or home theatre environment while reducing program cost, using less bandwidth and/or otherwise achieving greater resolution in regions of visual interest.

The further operation of system 125, including illustrative examples and several optional functions and features is described in greater detail in conjunction with FIGS. 6-16 that follow.

Figure 6:
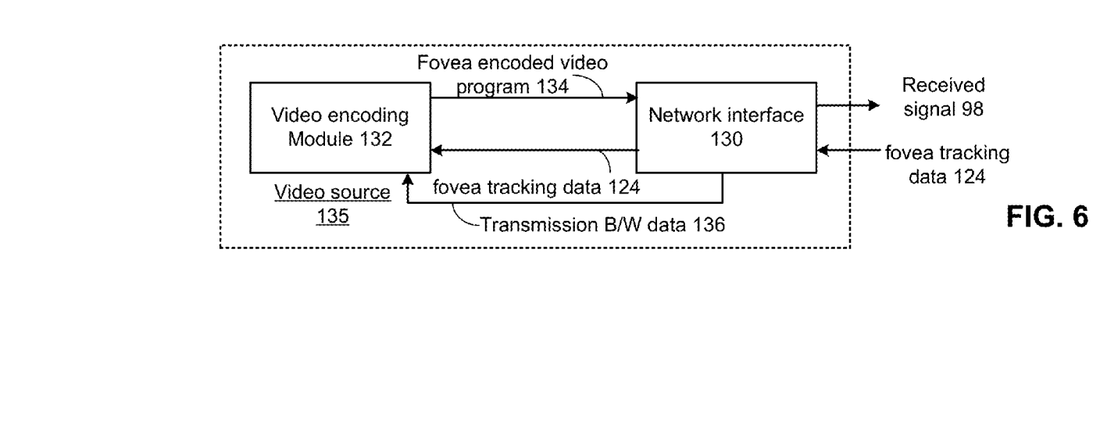
FIG. 6 presents a block diagram representation of a video source in accordance with an embodiment of the present disclosure.

FIG. 6 presents a block diagram representation of a video source 135 in accordance with an embodiment of the present disclosure. The video encoding module 132 responds to fovea tracking data 124 to selectively enable and/or disable fovea encoding and further to selectively generate fovea encoded video signal 134. The fovea encoded video signal 134 can be encoded in accordance with the fovea tracking data 124 to greater accuracy within one or more regions of viewer focus compared with an encoding accuracy outside the region(s) of viewer focus. As discussed the fovea encoded video signal 134 can be encoded to provide maximum resolution, color depth and encoding accuracy for the region or regions of viewer focus of any and all of the viewers. As the viewers change what they are looking at on the screen, the region or regions of accurate encoding can move around. The video source 135 further includes a network interface 130 for communicating via one or more networks with network interface 100 to receive fovea tracking data 124 and to format and send a received signal 98 that includes the fovea encoded video signal 134.

In an embodiment, the video encoding module 132 monitors transmission bandwidth data 136 that indicates a transmission bandwidth. The video encoding module 132 generates a fovea encoded video signal 134 in accordance with the fovea tracking data 124 to a first accuracy within the region(s) of viewer focus and to a second encoding accuracy outside the region(s) of viewer focus, such that the ratio between the first encoding accuracy and the second encoding accuracy is adjusted according to the transmission bandwidth. In this fashion, the compression difference between the fovea and peripheral regions can be adapted, dependent on available bandwidth. In off-hours, there can be only a slight difference between encoding accuracy in these two regions. As available transmission bandwidth decreases, encoding of the peripheral regions can be sacrificed to generate a higher ratio of compression difference between the fovea and peripheral regions.

Consider an example where a family of viewers are viewing a video program. In this case, the fovea tracking data 124 can indicate one or more different regions of viewer focus in the video program for the plurality of viewers. Mom and Dad may be watching the hero, but their son may have his attention focused on a female character in the same scene that he feels is particularly good looking. In an embodiment, the video encoding module 132 generates the fovea encoded video signal 134 in accordance with the fovea tracking data 124 to greater encoding accuracy within each of these two regions of viewer focus compared with an encoding accuracy outside the regions of viewer focus.

In the alternative, the video encoding module 132 may only support encoding for a single region of viewer focus. When multiple viewers are present, fovea encoding can be supported if the viewers have the same or similar regions of viewer focus. In particular a single common region of viewer focus can be determined based on the union of the regions of viewer focus for all viewers. In another example, a single common region of viewer focus can be determined based on a single region of viewer focus that best approximates the region of viewer focus for all viewers. In this embodiment, the video encoding module 132 can compare different regions of viewer focus for different viewers to determine an area of intersection and the single common area of viewer focus can be centered on the centroid of the area of intersection. The fovea encoded video signal 134 can be generated in accordance with the fovea tracking data 124 to disable fovea encoding when an area of intersection between the regions of viewer focus is smaller than a predetermined threshold—meaning that there may not be a large enough area of common viewer focus to warrant fovea encoding.

In addition to real-time fovea encoding/transcoding, consider an HLS/DASH implementation where segments of a video program are re-encoded and stored as multiple fovea modes corresponding to a plurality of possible fovea positions. In this case, the fovea encoded video signal 134 is generated in accordance with the fovea tracking data 124 to select a stored segment encoded with greater accuracy within the region of viewer focus compared with an encoding accuracy outside the region of viewer focus—as the closest match to the fovea position of one of the prestored segments. Non-fovea encoded segments of the video program can likewise be stored and selected in circumstances where the fovea tracking data 124 indicates that fovea tracking is disabled or is otherwise not possible due to a lack of fovea stability, or an impermissible lack of fovea consensus over a plurality of viewers. When the A/V player 104 selects the next video segment, it the video encoding module 132 selects a segment to retrieve as a fovea encoded video signal 134 to match the viewers' current fovea profile.

Figure 7:
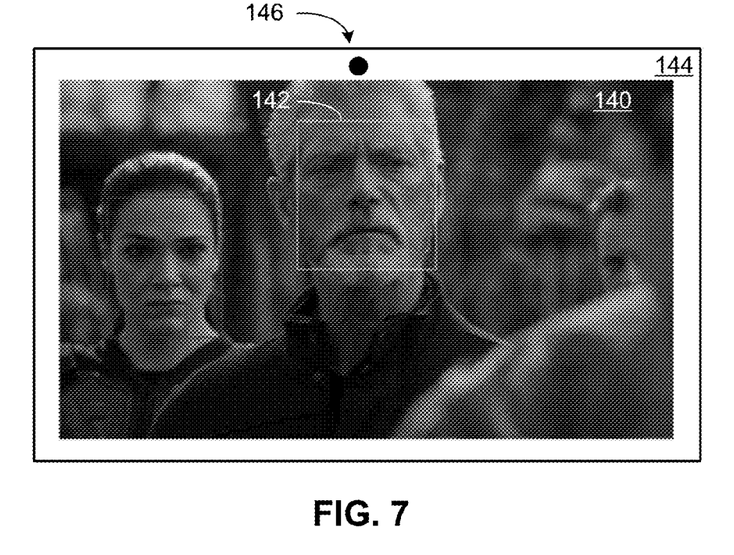
FIG. 7 presents a pictorial representation of a personal communication device in accordance with an embodiment of the present disclosure.

FIG. 7 presents a pictorial representation of a personal communication device in accordance with an embodiment of the present disclosure. In particular, a screen display 140 of a mobile device 144 is generated in conjunction with a system, such as system 125, are described in conjunction with functions and features of FIG. 5 that are referred to by common reference numerals. The viewer fovea tracking generator 120 analyzes image data 108 generated by a viewer sensors 106 such as back facing camera 146 corresponding to a viewing of the video program via the A/V player of the mobile device 144 by a viewer.

In this example, during a scene of a video program depicted in screen display 140, the viewer fovea tracking generator 120 tracks the eye and/or head movements of the viewer to determine a region of viewer interest 142. The video source 135 generates the received signal 98 to enhance the encoding accuracy in region of viewer interest 142 and to reduce the encoding accuracy regions of the video outside of the region, 142. In the example shown, the viewer's eyes are focusing on the face of Stephen Lang. The video source 135 responds to this region of viewer focus to encode the region of Stephen Lang's face with greater accuracy than the remaining portions of the scene.

Figure 8:
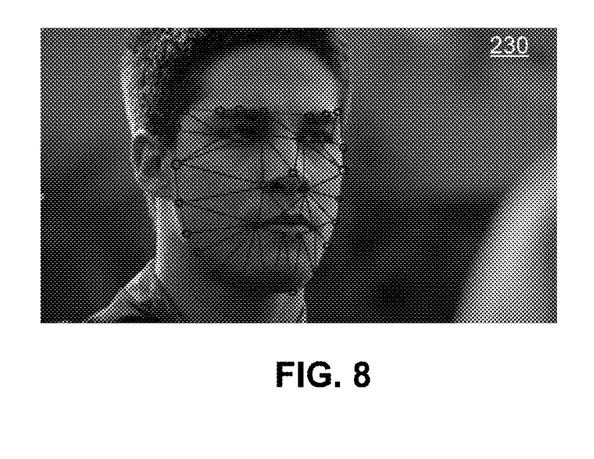
FIG. 8 presents a pictorial representation of a viewer image in accordance with an embodiment of the present disclosure.

FIG. 8 presents a pictorial representation of a video image in accordance with an embodiment of the present disclosure. In particular, a video image 230 is presented that represents an example of image data generated in conjunction with a system, such as system 125, that is described in conjunction with FIG. 5. The functions and features of system 125 are referred to by common reference numerals as presented in FIG. 5.

In an embodiment, the viewer fovea tracking generator 120 generates the fovea tracking data 124 based on facial modelling, recognition and tracking of the point of focus on the display device 105 of the viewer's eyes. In an embodiment, the viewer fovea tracking generator 120 analyzes the video image 230 to determine a number of users that are present, the locations of the users, the viewing angle for each of the users and a corresponding region of focus on the display device 105 for each viewer. In the example shown, a single viewer is present.

In one mode of operation, the viewer fovea tracking generator 120 analyzes video image 230 together with a skin color model used to roughly partition face candidates. The viewer fovea tracking generator 120 identifies and tracks candidate facial regions over a plurality of images (such as a sequence of images of the image data) and detects a face in the image based on the one or more of these images. For example, viewer fovea tracking generator 120 can operate via detection of colors in the image data. The viewer fovea tracking generator 120 generates a color bias corrected image from the video image 230 and a color transformed image from the color bias corrected image. The viewer fovea tracking generator 120 then operates to detect colors in the color transformed image that correspond to skin tones. In particular, viewer fovea tracking generator 120 can operate using an elliptic skin model in the transformed space such as a $C_bC_r$ subspace of a transformed $YC_bC_r$ space. In particular, a parametric ellipse corresponding to contours of constant Mahalanobis distance can be constructed under the assumption of Gaussian skin tone distribution to identify a facial region based on a two-dimension projection in the $C_bC_r$ subspace. As exemplars, the 853,571 pixels corresponding to skin patches from the Heinrich-Hertz-Institute image database can be used for this purpose, however, other exemplars can likewise be used in broader scope of the present disclosure.

In an embodiment, the viewer fovea tracking generator 120 tracks candidate facial regions over a sequence of images and detects a facial region based on an identification of facial motion and/or facial features in the candidate facial region over the sequence of images. This technique is based on 3D human face model that looks like a mesh that is overlaid on the video image 230. For example, face candidates can be validated for face detection based on the further recognition by viewer fovea tracking generator 120 of facial features, such as the shape, size, motion and relative position of face, eyebrows, eyes, nose, mouth, cheekbones and jaw. Any of these facial features extracted from the image data can be used by viewer fovea tracking generator 120 to detect each viewer that is present.

Further, the viewer fovea tracking generator 120 can employ temporal recognition to extract three-dimensional features based on different facial perspectives included in the plurality of images to improve the accuracy of the detection and recognition of the face of each viewer. Using temporal information, the problems of face detection including poor lighting, partially covering, size and posture sensitivity can be partly solved based on such facial tracking. Furthermore, based on profile view from a range of viewing angles, more accurate and 3D features such as contour of eye sockets, nose and chin can be extracted. Based on the number facial regions that are detected, the number of users present can be identified. In addition, the viewer fovea tracking generator 120 can identify the viewing angle of the users that are present and the region of viewer interest in the displayed video program based on the position of the detected faces in the field of view of the image data and their head and/or eye orientations.

Figure 9:
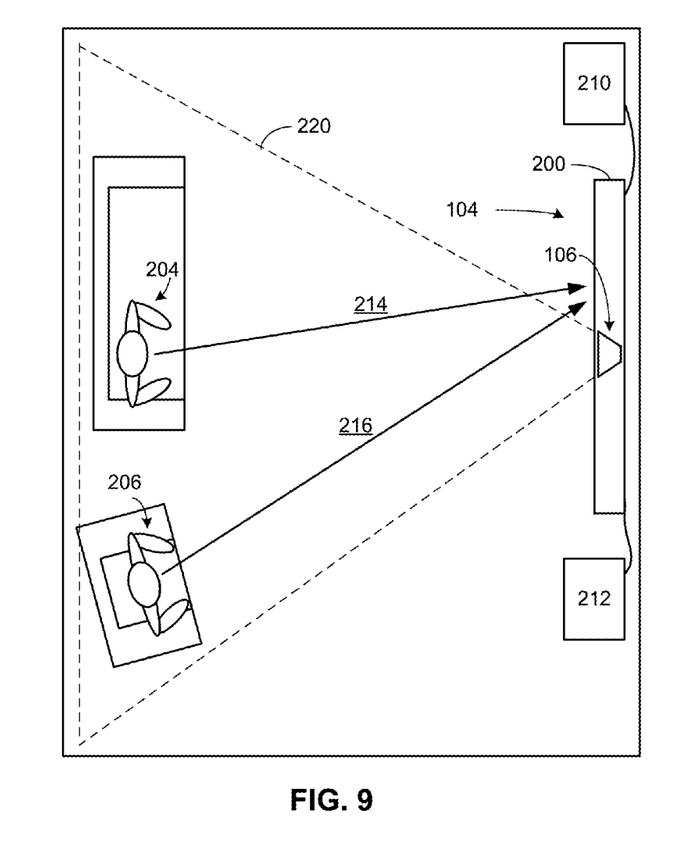
FIG. 9 presents a pictorial representation of a presentation area in accordance with an embodiment of the present disclosure.

FIG. 9 presents a pictorial representation of a presentation area in accordance with an embodiment of the present disclosure. In particular, the use of an example system 125 presented in conjunction with FIG. 5 that comprises a home theatre system is shown. The functions and features of system 125 are referred to by common reference numerals as presented in FIG. 5.

In this example, a viewer sensor 106 generates image data 108 in a presentation area 220 of the A/V player 104. The A/V player 104 includes a flat screen television 200 and speakers 210 and 212. The viewer sensor 106 can include a digital camera such as a still or video camera that is either a stand-alone device, or is incorporated in the flat screen television 200 and that generates image data 108. The viewer fovea tracking generator 120 analyzes the image data 108 to detect and recognize the viewers 204 and 206 of the A/V player 104 and their particular viewing vectors 214 and 216 (in three dimensions) in order to derive the corresponding regions of viewer interest in the display by the flat screen television 200. The intersection of each viewing vector can be equated to the centroid of a region of viewer focus of fixed size (e.g. a fixed percentage of the screen size) and shape (e.g. square, rectangle or other shape).

In a further embodiment, the viewer fovea tracking generator 120 is configured to estimate the distance from each of the viewers 204 and 206 to the television 200. For example, the viewer sensor 106 can includes two or more imaging sensors and the viewer fovea tracking generator 120 can triangulate the image results to determine the distance to each viewer. In another embodiment, the sizes of the heads of the viewers can be compared to standard head sizes or profile data for each viewer in order to estimate the distance of each viewer to the television 200 or other display screen. In operation, the viewer fovea tracking generator 120 can use the distance prediction to adjust the size of the region of viewer focus for each viewer. In particular, as the distance to the viewer decreases, the amount of the display screen in the central vision of the viewer also decreases. Similarly, as the distance to the viewer increases, the amount of the display screen in the central vision of the viewer also increases. In this fashion, the viewer fovea tracking generator 120 can use distance to determine a proper size of each estimated region of viewer focus to generate a more accurate estimate of each actual region of viewer focus.

Figure 10:
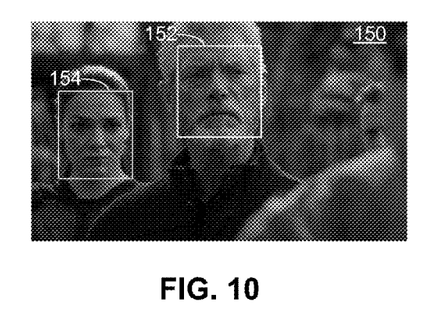
FIG. 10 presents a pictorial representation of a screen display in accordance with an embodiment of the present disclosure.

FIG. 10 presents a pictorial representation of a screen display in accordance with an embodiment of the present disclosure. In particular, a display screen 150 by display device 105 generated in conjunction with a system, such as system 125, is described in conjunction with functions and features of FIG. 5 that are referred to by common reference numerals.

In this example, a father and son are viewing a video program. In this case, the fovea tracking data 124 can indicate two different regions of viewer focus 152 and 154 in the video program for these two viewers. Dad is watching the hero and focusing his attention on region of viewer focus 152, but his son has his attention focused on a female character in region of viewer focus 154 in the same scene that he feels is particularly good looking.

In an embodiment, the video encoding module 132 generates the fovea encoded video signal 134 in accordance with the fovea tracking data 124 to greater encoding accuracy within each of these two regions of viewer focus 152 and 154 compared with an encoding accuracy outside the regions of viewer focus. In the alternative, the video encoding module 132 can compare different regions of viewer focus 152 and 154 to determine an area of intersection—in this case the null set. The fovea encoded video signal 134 can be generated in accordance with the fovea tracking data 124 to disable fovea encoding because the area of intersection between the regions of viewer focus is smaller than a predetermined threshold—meaning that there is not a large enough area of common viewer focus to warrant fovea encoding.

Figure 11:
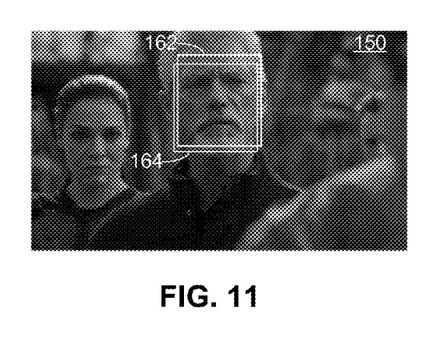
FIG. 11 presents a pictorial representation of a screen display in accordance with an embodiment of the present disclosure.

FIG. 11 presents a pictorial representation of a screen display in accordance with an embodiment of the present disclosure. In particular, a display screen 150 by display device 105 generated in conjunction with a system, such as system 125, is described in conjunction with functions and features of FIG. 5 that are referred to by common reference numerals.

Consider an example where a husband and wife are viewing a video program. In this case, the fovea tracking data 124 can indicate two different regions of viewer focus 162 and 164 in the video program for these two viewers. Mom and Dad are both watching the hero, Stephen Lang. In an embodiment, the video encoding module 132 generates the fovea encoded video signal 134 in accordance with the fovea tracking data 124 to greater encoding accuracy within the union of these two regions of viewer focus compared with an encoding accuracy outside the union of these two regions of viewer focus. In the alternative, the video encoding module 132 can compare the two different regions of viewer focus 162 and 164 to determine an area of intersection. The fovea encoded video signal 134 can be generated in accordance with the fovea tracking data 124 to enable fovea encoding because the area of intersection between the regions of viewer focus 162 and 164 is greater than a predetermined threshold—meaning that there is a large enough area of common viewer focus to warrant fovea encoding.

Figure 12:
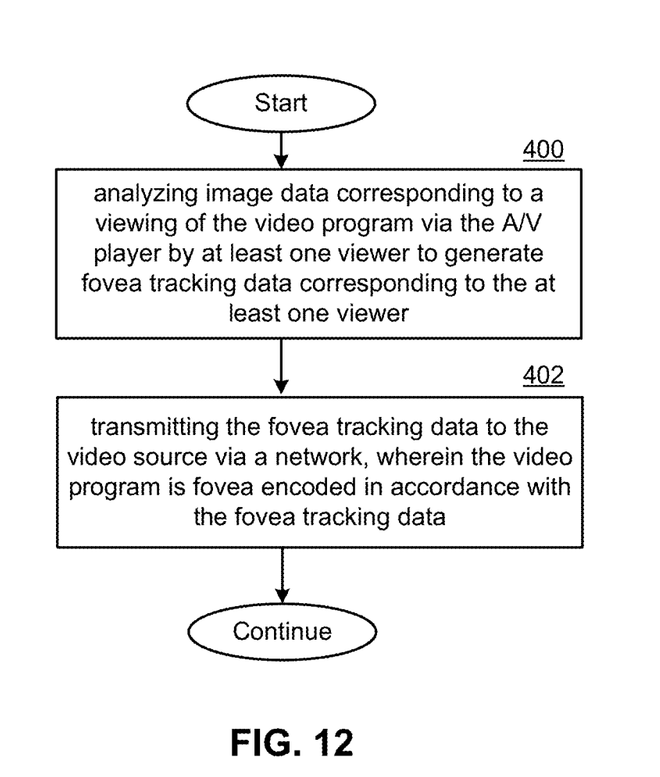
FIG. 12 presents a flowchart representation of a method in accordance with an embodiment of the present disclosure.

FIG. 12 presents a flowchart representation of a method in accordance with an embodiment of the present disclosure. In particular, a method is presented for use in with one or more features described in conjunction with FIGS. 1-11. Step 400 includes analyzing image data corresponding to a viewing of the video program via the A/V player by at least one viewer to generate fovea tracking data corresponding to the at least one viewer. Step 402 includes transmitting the fovea tracking data to the video source via a network, wherein the video program is fovea encoded in accordance with the fovea tracking data.

In an embodiment, the fovea tracking data indicates a region of viewer focus in the video program corresponding to the at least one viewer, and the video program is fovea encoded in accordance with the fovea tracking data to greater accuracy within the region of viewer focus compared with an encoding accuracy outside the region of viewer focus. The video source can monitor a transmission bandwidth and the video program can be fovea encoded in accordance with the fovea tracking data to a first accuracy within the region of viewer focus and to a second encoding accuracy outside the region of viewer focus, such that the ratio between the first encoding accuracy and the second encoding accuracy is adjusted according to the transmission bandwidth.

In an embodiment, the fovea tracking data indicates a region of viewer focus in the video program corresponding to the at least one viewer, and the video program is fovea encoded in accordance with the fovea tracking data to select a stored segment encoded with greater accuracy within the region of viewer focus compared with an encoding accuracy outside the region of viewer focus. A plurality of viewers can be present and the fovea tracking data can indicate a region of viewer focus in the video program for each of the plurality of viewers. The video program can fovea encoded in accordance with the fovea tracking data to greater encoding accuracy within each of the regions of viewer focus compared with an encoding accuracy outside the regions of viewer focus. The video program can be fovea encoded in accordance with the fovea tracking data to disable fovea encoding when an area of intersection between the regions of viewer focus is smaller than a predetermined threshold. In addition, the fovea tracking data can be generated based on a facial modelling of the at least one viewer.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A system for use with an audio/video (A/V) player that plays a video program from a video source, the system comprising:
    a viewer fovea tracking generator configured to analyze image data corresponding to a viewing of the video program via the A/V player by at least one viewer, and that generates fovea tracking data corresponding to the at least one viewer; and
    a network interface configured to transmit the fovea tracking data to the video source via a network;
    wherein the fovea tracking data indicates a region of viewer focus in the video program corresponding to the at least one viewer; and wherein in a first mode of operation, the video program is fovea encoded in accordance with the fovea tracking data by selecting a pre-encoded stored segment, wherein pre-encoding of the pre-encoded stored segment corresponds to greater encoding accuracy within the region of viewer focus compared with an encoding accuracy outside the region of viewer focus, and wherein the video program is fovea encoded in accordance with the fovea tracking data to enable fovea encoding when the fovea tracking data indicates a stable region of viewer focus.

2. The system of claim 1 wherein in a second mode of operation, the video program is fovea encoded in accordance with the fovea tracking data by generating a segment encoded with greater accuracy within the region of viewer focus compared with an encoding accuracy outside the region of viewer focus.

3. The system of claim 2 wherein the video source monitors a transmission bandwidth and wherein the video program is fovea encoded in accordance with the fovea tracking data to a first encoding accuracy within the region of viewer focus and to a second encoding accuracy outside the region of viewer focus, and wherein a ratio between the first encoding accuracy and the second encoding accuracy is adjusted according to the transmission bandwidth.

4. The system of claim 1 wherein the at least one viewer includes a plurality of viewers and the fovea tracking data indicates a region of viewer focus in the video program for each of the plurality of viewers.

5. The system of claim 4 wherein the video program is fovea encoded in accordance with the fovea tracking data to greater encoding accuracy within each of the regions of viewer focus compared with an encoding accuracy outside the regions of viewer focus.

6. The system of claim 4 wherein the video program is fovea encoded in accordance with the fovea tracking data to disable fovea encoding when an area of intersection between the regions of viewer focus is smaller than a predetermined threshold.

7. The system of claim 1 wherein the viewer fovea tracking generator generates the fovea tracking data corresponding to the at least one viewer based on a facial modelling.

8. The system of claim 1 wherein fovea encoding is enabled when a selection to enable fovea encoding is made by the at least one viewer via a user interface presented on a display device associated with the A/V player.

9. A method with an audio/video (A/V) player that plays a video program from a video source, the method comprising:
analyzing image data corresponding to a viewing of the video program via the A/V player by at least one viewer to generate fovea tracking data corresponding to the at least one viewer, wherein the fovea tracking data indicates a region of viewer focus in the video program corresponding to the at least one viewer; and
transmitting the fovea tracking data to the video source via a network, wherein in a first mode of operation, the video program is fovea encoded in accordance with the fovea tracking data by selecting a pre-encoded stored segment, wherein pre-encoding of the pre-encoded stored segment corresponds to greater encoding accuracy within the region of viewer focus compared with an encoding accuracy outside the region of viewer focus, and wherein the video program is fovea encoded in accordance with the fovea tracking data to enable fovea encoding when the fovea tracking data indicates a stable region of viewer focus.

10. The method of claim 9 wherein in a second mode of operation, the video program is fovea encoded in accordance with the fovea tracking data by generating a segment encoded with greater accuracy within the region of viewer focus compared with an encoding accuracy outside the region of viewer focus.

11. The method of claim 10 wherein the video source monitors a transmission bandwidth and wherein the video program is fovea encoded in accordance with the fovea tracking data to a first encoding accuracy within the region of viewer focus and to a second encoding accuracy outside the region of viewer focus, and wherein a ratio between the first encoding accuracy and the second encoding accuracy is adjusted according to the transmission bandwidth.

12. The method of claim 9 wherein the at least one viewer includes a plurality of viewers and the fovea tracking data indicates a region of viewer focus in the video program for each of the plurality of viewers.

13. The method of claim 12 wherein the video program is fovea encoded in accordance with the fovea tracking data to greater encoding accuracy within each of the regions of viewer focus compared with an encoding accuracy outside the regions of viewer focus.

14. The method of claim 12 wherein the video program is fovea encoded in accordance with the fovea tracking data to disable fovea encoding when an area of intersection between the regions of viewer focus is smaller than a predetermined threshold.

15. The method of claim 12 wherein the fovea tracking data is generated based on a facial modelling of the at least one viewer.

16. The method of claim 9 wherein fovea encoding is enabled when a selection to enable fovea encoding is made by the at least one viewer via a user interface presented on a display device associated with the A/V player.

* * * * *